United States Patent
Schein et al.

(10) Patent No.: US 8,704,421 B2
(45) Date of Patent: Apr. 22, 2014

(54) SPOOL CARRIER HAVING A SPECIAL CONTOUR

(75) Inventors: Uwe Schein, Kaufungen (DE); Klaus Werner, Kronberg (DE); Heinrich Zuber, Schwalbach am Taunus (DE)

(73) Assignee: Continental Automotive GmbH, Hannover (DE)

( * ) Notice: Subject to any disclaimer, the term of this patent is extended or adjusted under 35 U.S.C. 154(b) by 1109 days.

(21) Appl. No.: 12/672,746

(22) PCT Filed: Aug. 8, 2008

(86) PCT No.: PCT/EP2008/060428
§ 371 (c)(1),
(2), (4) Date: Feb. 9, 2010

(87) PCT Pub. No.: WO2009/019309
PCT Pub. Date: Feb. 12, 2009

(65) Prior Publication Data
US 2011/0180357 A1    Jul. 28, 2011

(30) Foreign Application Priority Data
Aug. 9, 2007 (DE) .......................... 10 2007 037 611

(51) Int. Cl.
*H02K 3/34* (2006.01)
(52) U.S. Cl.
USPC .......................................... 310/215
(58) Field of Classification Search
USPC ................. 310/214, 215, 43; 361/38
See application file for complete search history.

(56) References Cited

U.S. PATENT DOCUMENTS

| | | | |
|---|---|---|---|
| 5,420,559 A | 5/1995 | Ohshiba et al. | 336/208 |
| 6,741,009 B1 * | 5/2004 | Ando et al. | 310/254.1 |
| 6,870,292 B2 | 3/2005 | Owada et al. | 310/194 |
| 7,667,368 B2 * | 2/2010 | Matsuzaki et al. | 310/268 |
| 2003/0098630 A1 | 5/2003 | Owada et al. | 310/259 |
| 2006/0006758 A1 * | 1/2006 | Yamada | 310/194 |

FOREIGN PATENT DOCUMENTS

| | | | | |
|---|---|---|---|---|
| DE | 20204507 U1 | 6/2002 | | H02K 3/52 |
| EP | 1317048 A2 | 6/2003 | | H02K 3/24 |
| GB | 799167 A | 8/1958 | | H01J 29/76 |
| JP | 2005027442 A | 1/2005 | | H02K 1/02 |

OTHER PUBLICATIONS

International PCT Search Report, PCT/EP2008/060428, 9 pages, Mailed Apr. 6, 2009.
German Office Action, German application No. 10 2006 037 611.3-32, 3 pages, Jan. 17, 2008.

* cited by examiner

*Primary Examiner* — Nguyen N Hanh
(74) *Attorney, Agent, or Firm* — King & Spalding L.L.P.

(57) ABSTRACT

A spool carrier has a winding body with a shell having a trapezoidal cross section with two substantially right angles and one acute angle, wherein the spool wire is guided on the obtuse angle edge of the winding body, beginning parallel to the front face edges of the winding body, along the side surface adjoining the obtuse angle edge, around the winding body, to the acute angle edge of the winding body, and guided on the front face from the acute to the obtuse angle edge at an angle to the front face edge, such that it comes to rest on the obtuse angle edge in one winding step directly adjacent to the winding wire of the previous winding, and in one winding step in the next adjacent groove between two windings of the previous layer, or optionally between the flange and the winding of the previous layer.

17 Claims, 1 Drawing Sheet

FIG 1 (Prior Art)
FIG 2
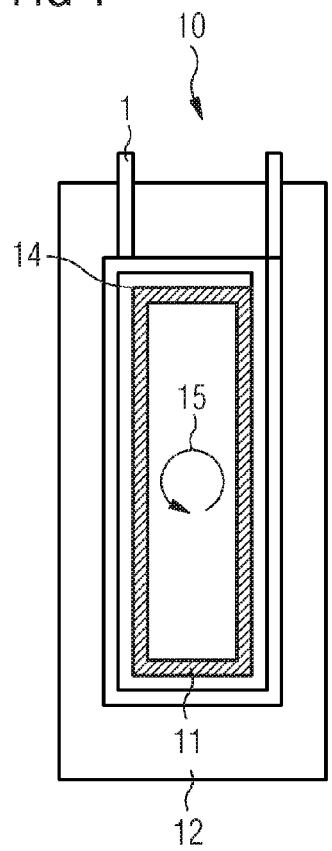
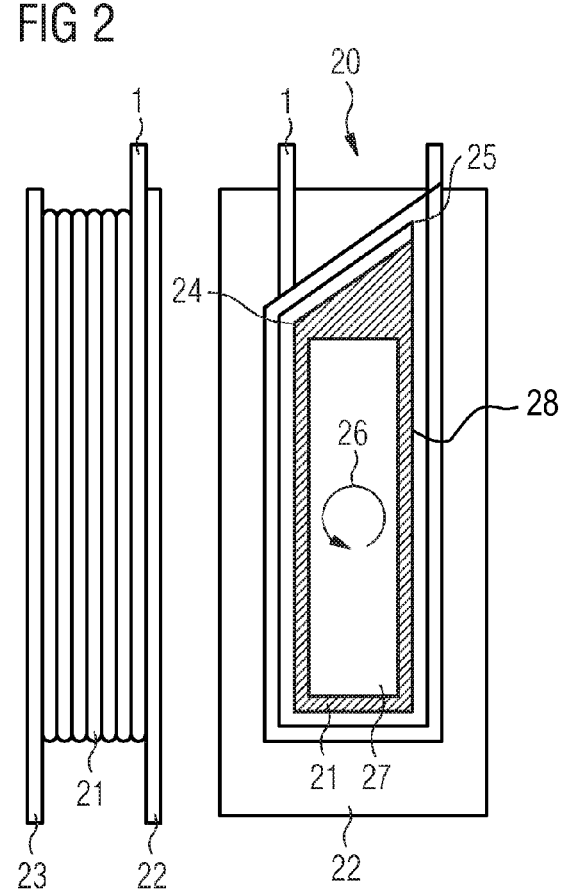
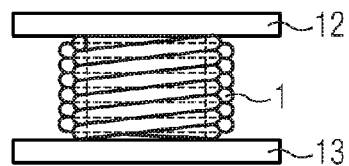
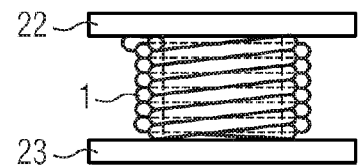

SPOOL CARRIER HAVING A SPECIAL CONTOUR

CROSS-REFERENCE TO RELATED APPLICATIONS

This application is a U.S. National Stage Application of International Application No. PCT/EP2008/060428 filed Aug. 8, 2008, which designates the United States of America, and claims priority to German Application No. 10 2007 037 611.3 filed Aug. 9, 2007, the contents of which are hereby incorporated by reference in their entirety.

TECHNICAL FIELD

The invention relates to a coil carrier for a coil arrangement and refers in particular to coil carriers for the manufacture of pole teeth in electric motors.

BACKGROUND

As a general rule brushless electric motors have a rotor equipped with permanent magnets, which is rotatably mounted inside a stator carrying a plurality of stator coils. The individual stator coils are for the most part combined by means of winding heads to form multiphase (usually three-phase) stator coil strings which are commutated electrically by means of power conversion electronics. Brushless electric motors are distinguished by a low maintenance requirement and a greater degree of efficiency compared with brushed machines. They are therefore suited in particular for use in electromechanical braking devices, such as wedge brakes for example.

In order to achieve high motor powers with small dimensions the stator coils of the individual stator poles must be implemented as single-tooth windings with a high winding density. In the case of a high winding density, the volume occupied by the empty spaces between the coil wires is minimized, and accordingly the space occupied by the coil wire material—copper as a general rule—is maximized. The proportion of the space occupied by the coil wire material in relation to the total volume of the coil winding is referred to as copper fill factor. In the case of a higher copper fill factor realized by way of a higher winding count, in other words by means of a denser packing of the windings, a greater stator pole field and thus a higher motor torque are obtained with the wire diameter remaining unchanged and with the same coil current, whereby the coil volume is retained unchanged.

The attainable motor torque is not however determined only by way of the copper fill factor of the individual stator poles but also by way of the copper fill factor of the stator arrangement overall. To this end, the stator coils of adjacent stator poles must abut one another as gaplessly as possible, to which end the abutting side faces of the pole teeth, in other words the side faces of the stator coils arranged at the stator poles, must be as flat as possible. This is achieved by means of an orthocyclic winding of the pole teeth, in which the wires of one winding layer are guided into the grooves (in other words the depressions in the surface of a winding layer in the area of two abutting winding wires) of the winding layer situated thereunder in each case. As a result, in cross section the coil winding shows a honeycomb-like hexagonal packing structure, wherein an optimum degree of groove filling (in other words the highest possible copper fill factor) and a flat external delimitation of the winding within half a wire diameter are achieved.

The stator coils used for the pole teeth of the electric motors described above are wound around a coil carrier having a winding former rectangular in cross section, the length of which exceeds its width by several times. In order to obtain an orthocyclic winding as described above also in the case of such types of length-to-width ratios, the winding and layer transitions of a coil winding are in each case undertaken at a front face of the winding former. If the winding transition or layer transition were to come to be located at one of the side faces of the winding former, then this side face would have a prominence and no longer have the requisite flatness for a closely adjacent fitting of the pole teeth.

It has however become apparent that automated orthocyclic winding is not possible in the case of long narrow coil carriers having a rectangular cross section because the winding and layer transitions cannot be forced at the front face of the winding former intended for this. Winding of the coil carriers for narrow stator poles is therefore carried manually at the present time. Mass production tailored to the cost requirements of automobile manufacture is however not possible in this way.

SUMMARY

According to various embodiments, a coil carrier and a coil can be specified, wherein the winding transition and the layer transition of an automatically applied winding can always be forced at a particular front face of the winding former.

According to an embodiment, a coil carrier may comprise a winding former, wherein a shell of the winding former has a trapezoidal cross section having two essentially right angles and one acute angle.

According to a further embodiment, the acute angle can be 65 degrees. According to a further embodiment, at least one of the two end faces of the winding former may abut against a flange which projects beyond the cross sectional area of the winding former. According to a further embodiment, each of the two end faces of the winding former may abut against a flange which projects beyond the cross sectional area of the winding former. According to a further embodiment, the coil carrier may have an opening which extends right through the winding former. According to a further embodiment, the cross sectional geometry of the opening can be different from that of the shell of the winding former. According to a further embodiment, the cross section of the opening between the end faces of the winding former is not constant. According to a further embodiment, the winding former may have an iron core which is surrounded by an electrically insulating material such that the shell of the winding former is formed having a trapezoidal cross section of outer surfaces of the electrically insulating material.

According to another embodiment, a coil arrangement may comprise such a coil carrier as described above, wherein the coil wire is guided on the obtuse angled edge of the winding former, beginning parallel to the end face edges of the winding former, along the side face abutting against the obtuse angled edge, around the winding former, to the acute angled edge of the winding former, and is guided on the front face from the acute angled edge to the obtuse angled edge obliquely with respect to the front face edge, such that it comes to be located on the obtuse angled edge in the case of a winding transition directly beside the winding wire of the previous winding and in the case of a winding layer transition in the nearest groove between two windings of the previous layer, or if applicable between flange and winding of the previous layer.

According to yet another embodiment, an electric motor may have at least one pole tooth, which may include a coil arrangement as described above.

According to yet another embodiment, an electromechanical braking device may have an electric motor as described above.

According to a further embodiment, the braking device may be designed as a self-energizing wedge brake.

BRIEF DESCRIPTION OF THE DRAWINGS

Further features of the invention will emerge from the following description of exemplary embodiments and also the figures. With regard to an embodiment, the individual features can each be realized on their own account or as a plurality. In the following description of several exemplary embodiments, reference is made to the accompanying figures. In the drawings:

FIG. 1 shows a conventional coil carrier for pole teeth and

FIG. 2 shows a coil carrier for pole teeth suitable for the automatic application of an orthocyclic winding.

DETAILED DESCRIPTION

According to various embodiments, a coil carrier may have a winding former, the shell of which has a trapezoidal cross section having two essentially right angles and one acute angle.

By means of the acute angle of the winding former, the layer of the winding wire can be fixed before each winding and layer transition, such that the tendency of the winding wire to skip the intended positions in the case of the winding or winding layer transition is reduced. Furthermore, as a result of the skewing associated with the acute angle of the front face, the width of the latter is increased. By this means the angle with which the wire must be guided along the front face in order to produce the wire displacement required for the winding or layer transition is reduced. With a smaller skewing angle, however, the shear forces exerted on the wire by way of the winding tension are also reduced.

According to other embodiments, a coil arrangement may have a corresponding coil carrier, whereby the coil wire is guided on the obtuse angled edge of the winding former, beginning parallel to the end face edges of the winding former, along the side face abutting against the obtuse angled edge, around the winding former, to the acute angled edge of the winding former, and is guided on the front face from the acute angled edge to the obtuse angled edge obliquely with respect to the end face edge, such that it comes to be located on the obtuse angled edge in the case of a winding transition directly beside the winding wire of the previous winding and in the case of a winding layer transition in the nearest groove between two windings of the previous layer, or if applicable between flange and winding of the previous layer.

A corresponding coil arrangement has a compact construction form having smooth outer surfaces within the winding wire radius, which can thus be incorporated gaplessly beside one another in the stator of a motor.

In addition, according to other embodiments, an electric motor may have at least one pole tooth which includes such a coil arrangement, and also an electromechanical braking device which is equipped with such an electric motor. As a result of the smooth delimitation of the outer surfaces of the coil arrangement no pre-damage occurs to the pole teeth during fitting, such that a reliable motor is obtained which is conducive to reliable functioning of an electromechanical brake.

It should be noted in this context that the terms "comprise", "have/has", "include", "contain" and "having", as well as their grammatical variants, used in this description and the claims for the listing of features generally denote a non-exclusive listing of features, such as for example method steps, devices, ranges, variables and the like, which in no way excludes the presence of other or additional features or groups of other or additional features.

The acute angle is preferably 65 degrees, by which means a secure fixing of the winding wire before the winding and layer transitions is achieved without making the bending radii of the winding wire at this edge too narrow or excessively extending the overall length of the coil carrier.

In order to prevent the winding wire from slipping off the winding former, at least one of the two end faces of the winding former advantageously abuts against a flange which projects beyond the cross sectional area of the winding former. Advantageously, each of the two end faces of the winding former abuts in each case against a flange which projects beyond the cross sectional area of the winding former, such that the winding wire is permanently fixed on the winding former.

For the purpose of simple fastening on the iron core of a stator pole, the coil carrier advantageously has an opening which extends right through the winding former. In order to be able to keep the coil geometry independent of the iron core geometry, the cross sectional geometry of the opening is conveniently implemented differently from that of the shell of the winding former. A solid seating of the coil carrier on the stator pole is advantageously achieved if the cross section of the opening between the end faces of the winding former is not constant.

In an alternative embodiment, the winding former has an iron core which is surrounded by an electrically insulating material such that the shell of the winding former is formed having a trapezoidal cross section of outer surfaces of the electrically insulating material.

By preference, the braking device described above is designed as a self-energizing wedge brake because this utilizes the energy of the object to be braked to reinforce the braking force and can thus be operated with smaller electric motors.

A cross sectional view and a front view of a conventional coil carrier 10 for use in stator poles are illustrated in FIG. 1. The coil wire 1 is wound onto the block-shaped winding former 11 of the coil carrier 10. In order to stabilize the coil winding on the winding former, a flange 12 and 13 respectively is situated at each of the two end faces of the winding former. In order to produce an orthocyclic winding, the winding wire 1 is guided along in the winding direction 15 on a flange internal surface (counterclockwise in the figure) around three side faces of the winding former. On the fourth (upper in the figure) side face the winding wire is first guided away from the flange face and towards the transfer edge 14 and there beside the wire 1 of the previous winding, in order to then be guided ever further around the winding former, abutting the wire of the lower winding in each case, until the distance to the opposite flange face is no longer sufficient to introduce a further winding, whereby a complete winding layer has been applied to the winding former.

As can be seen from the front view in the lower part of FIG. 1, the next winding layer is placed over the previously applied winding layer by guiding the winding wire 1 on the fourth side face in the direction of the opposite flange face for the given situation, inclined towards the transfer edge 14 such that it is transferred there into the groove between the two windings of the previously applied winding layer situated closest to the flange face closest at the present time. In the case of a layer transition to one of the further winding layers, the wire can be transferred into the groove between the wire of the last winding and the adjacent flange.

An extremely compact winding profile is thus produced, wherein the individual windings of a winding layer are situated parallel beside one another and the winding wires of a winding layer are guided on three side faces of the winding in the depressions (or the grooves) on the surface of the previous winding layer, whereby the grooves between two windings are produced as a result of the round cross sectional geometry of the coil wire. On the fourth side face, the windings of two winding layers lying one above the other cross over, as is illustrated in the front view in the lower part of FIG. 1 (to facilitate understanding of the arrangement, the winding wires of the lower winding layer are drawn not concealed in this illustration).

In order to form the winding transition and also the layer transition the winding sections on the fourth side face must therefore, as can be seen in FIG. 1, run at an angle to the flange faces or to the edges of the winding former on the end face side. The shorter (in the direction the wire is guided) this side face is, the greater is this angle and thus also the tendency to skip a previously wound wire, or to jump out from the desired groove position.

With regard to narrow coil carriers, in the case of an automated winding process uncontrolled winding and layer transitions therefore frequently occur, the result of which is a disordered winding to a greater or lesser extent instead of an orthocyclic winding. Since in the case of a disordered winding the compact arrangement of the coil wires required on the long sides is no longer given, damage can occur when these incorrectly wound stator coils are fitted into the stator of a motor.

In order to avoid such uncontrolled winding and layer transitions during automatic wrapping of narrow coil carriers, the front face is arranged on one of the two narrow sides of the winding former 21 shown in FIG. 2 askew from its long sides. As a result, the cross section of the winding former has a trapezoidal shape. On account of this skewing the width of this front face is greater than that of the winding former 21, by which means the displacement of the winding wire 1 with regard to the winding transition and also the layer transition at the skewed front face is reduced. Since the shear forces acting on the wire by way of the winding tension are likewise lower with a smaller displacement, the tendency of the winding wire to skip the intended positions is thus reduced.

Through the skewing of the front face at acute edge 25 an acute edge angle is formed, at which the winding wire 1 is better fixed in its layer by the winding tension. If this acute angled edge is located before the (now obtuse angled) transfer edge 24 in the winding direction, this then gives a stable initial position prior to a winding transition or winding layer transition. In the case of higher winding layers, this fixing of the winding wire at the acute edge 25 is supported in particular by the improved force fitting of the wire by way of the winding tension into the groove formed between two wires of the previous layer. Thus, even in the case of automated wrapping of the coil carrier 20, exact winding and layer transitions and thus error-free orthocyclic wrapping of the shell of the winding former 21 can be achieved without additional means.

In principle, the fixing of the wire 1 prior to a winding or layer transition would be all the better the more acute angled were the implementation of the acute edge 25. Moreover, the width of the front face increases as the angle becomes smaller, and thus the wire 1 needs to be guided less obliquely over this face. The length of the coil carrier does however increase as a result of the acute angled implementation of this winding former edge, with the result that the overall size of correspondingly equipped electric motors can increase. The skewing of the front face is therefore as far as possible restricted to a degree at which the bending radius of the winding wire 1 around the acute edge 25 is still large enough even in the case of the outer winding layers (the bending radius increases as a function of the wire diameter as the layer count increases) in order to guarantee a good layer fixing of the wire, and the width of the front face is adequate in order that the shear forces acting on the wire during winding are sufficiently small so as to avoid any skipping of the intended layer. It has been shown that a layer stabilization adequate for automatic wrapping of the winding wire 1 for the winding or layer transition is already given in the case of angles of about 65 degrees. The extension of the stator coil caused by this is still sufficiently small particularly with regard to the length-to-width ratios of greater than 4:1 normal for stator poles so as not to substantially influence the overall size of the motor.

The coil carrier 20 shown in FIG. 2 additionally has two flanges 22 and 23 which, as in the case of a conventional coil carrier in accordance with FIG. 1, project beyond the cross sectional area of the winding former 21 and thus prevent the winding from slipping off the winding former 21. For mounting the stator coil onto the associated iron core of the stator the coil carrier 20 has an opening 27 which extends right through the flanges 22 and 23 and the winding former 21. The form of the opening is matched to the iron core on the stator and can, as shown, differ from the shell of the winding former 21. To ensure firm seating of the coil carrier on the iron core of the stator the cross section of the opening can have a tapering in order to achieve a pressing force.

In an alternative embodiment, the winding former 21 already has in its interior an iron core which is coated with an electrically insulating material 28. This electrically insulating material 28 covers the iron core at least on the outer faces, along which the wire 1 is wound.

In order to wrap the coil carrier 20, the coil or winding wire 1 is guided in the winding direction 26 along the end face edge of the winding former 21, in other words parallel to this edge or abutting against the flange 22, beginning from the obtuse angled transfer edge 24 along the (left-hand in FIG. 2) side face, over the straight front face and the second side face to the acute edge of the winding former and around the latter. From the acute angled edge, the wire 1 is guided over the skewed front face at an angle skewed with respect to the end face edge there to the obtuse angled edge, such that it winds around the latter beside the wire 1 situated there, and is guided parallel to and in contact with this wire more times around the winding former. On completion of the first winding layer, the wire 1 is guided at the obtuse angled edge into the nearest groove between two windings of the previous winding layer. On the transition to the third winding layer, the wire 1 can at the obtuse angled edge into the nearest groove between flange and winding of the previous winding layer. This is indicated in the front view in the lower illustration in FIG. 2 by a dotted line.

A coil carrier 20 is suited in particular to the manufacture of a coil arrangement for use as a pole tooth in electric motors. Since in the case of a coil arrangement manufactured automatically in accordance with the method described above a compact orthocyclic winding structure can be achieved very reliably, there is no danger of pre-damage occurring to the coil arrangement on fitting into the stator. A correspondingly produced stator coil therefore enables the manufacture of a reliable electric motor having a high copper fill factor. Such a motor is suited in particular for use in electromechanical braking devices, primarily in the case of self-energizing wedge brakes.

LIST OF REFERENCE CHARACTERS

1 Coil/winding wire
10 Prior art coil carrier
11 Prior art winding former
12 First coil carrier flange
13 Second coil carrier flange
14 Transfer edge
15 Winding direction
20 Coil carrier according to an embodiment
21 Winding former according to an embodiment
22 First coil carrier flange
23 Second coil carrier flange
24 Transfer edge
25 Acute angled edge
26 Winding direction
27 Opening through the winding former

What is claimed is:

1. A coil carrier comprising:
a winding former including a shell defining side faces for winding coil wire, the shell having a trapezoidal cross section with two essentially right angles and one acute angle; and
wherein the shell includes an iron core surrounded by an electrically insulating material disposed on the side faces of the shell.

2. The coil carrier according to claim 1, wherein the acute angle is 65 degrees.

3. The coil carrier according to claim 1, wherein at least one of two end faces of the winding former abuts against a flange which projects beyond a cross sectional area of the winding former.

4. The coil carrier according to claim 3, wherein each of two end faces of the winding former abuts against a flange which projects beyond a cross sectional area of the winding former.

5. The coil carrier according to claim 1, wherein the coil carrier has an opening which extends right through the winding former.

6. The coil carrier according to claim 5, wherein a cross sectional geometry of the opening is different from that of the shell of the winding former.

7. The coil carrier according to claim 5, wherein a cross section of the opening between end faces of the winding former is not constant.

8. A coil arrangement comprising:
a winding former including a shell defining side laces for winding coil wire, the shell having a trapezoidal cross section with two essentially right angles and one acute angle; and
wherein the shell includes an iron core surrounded by an electrically insulating material disposed on the side faces of the shell;
wherein the coil wire is guided on an obtuse angled edge of the winding former, beginning parallel to flanges of the winding former, along a first side face abutting against the obtuse angled edge, around the winding former, to the acute angled edge of the winding former, and is guided on a second side face from the acute angled edge to the obtuse angled edge obliquely with respect to edge, such that it comes to be located on the obtuse angled edge in the case of a winding transition directly beside the coil wire of a previous winding and in the case of a winding layer transition in a nearest groove between two windings of a previous layer, or if applicable between flange and winding of the previous layer.

9. An electric motor having at least one pole tooth, which includes a coil arrangement according to claim 8.

10. A coil arrangement according to claim 8, wherein the acute angle is 65 degrees.

11. A coil arrangement according to claim 8, wherein at least one of two end faces of the winding former abuts against a flange which projects beyond a cross sectional area of the winding former.

12. A coil arrangement according to claim 8, wherein each of two end faces of the winding former abuts against a flange which projects beyond a cross sectional area of the winding former.

13. A coil arrangement according to claim 8, wherein the coil carrier has an opening which extends right through the winding former.

14. A coil arrangement according to claim 13, wherein a cross sectional geometry of the opening is different from that of the shell of the winding former.

15. A coil arrangement according to claim 13, wherein a cross section of the opening between the end faces of the winding former is not constant.

16. A coil arrangement according to claim 8, wherein the winding former has an iron core which is surrounded by an electrically insulating material such that the shell of the winding former is formed having a trapezoidal cross section of outer surfaces of the electrically insulating material.

17. A method for providing a coil carrier, comprising the steps of:
providing a winding former including a shell defining side faces for winding coil wire, the shell having a cross section with two essentially right angles, an obtuse angle and an acute angle, wherein the shell includes an iron core surrounded by an electrically insulating material disposed on the side faces of the shell,
guiding a coil wire on an obtuse angled edge of the winding former, beginning parallel to a flange of the winding former, along a side face abutting against the obtuse angled edge, around the winding former, to an acute angled edge of the winding former, and guiding the coil wire on a first side face from the acute angled edge to the obtuse angled edge obliquely with respect to an edge, such that it comes to be located on an obtuse angled edge in the case of a winding transition directly beside the coil wire of a previous winding and in the case of a winding layer transition in a nearest groove between two windings of a previous layer or between a flange and winding of the previous layer.

* * * * *